(12) United States Patent
Palladino et al.

(10) Patent No.: US 11,582,291 B2
(45) Date of Patent: Feb. 14, 2023

(54) AUTO-DOCUMENTATION FOR APPLICATION PROGRAM INTERFACES BASED ON NETWORK REQUESTS AND RESPONSES

(71) Applicant: KONG INC., San Francisco, CA (US)

(72) Inventors: Marco Palladino, San Francisco, CA (US); Augusto Marietti, San Francisco, CA (US)

(73) Assignee: KONG INC., San Francisco, CA (US)

( * ) Notice: Subject to any disclaimer, the term of this patent is extended or adjusted under 35 U.S.C. 154(b) by 0 days.

(21) Appl. No.: 16/933,287

(22) Filed: Jul. 20, 2020

(65) Prior Publication Data

US 2020/0351332 A1   Nov. 5, 2020
US 2022/0103613 A9   Mar. 31, 2022

Related U.S. Application Data

(63) Continuation-in-part of application No. 16/714,662, filed on Dec. 13, 2019, now Pat. No. 11,171,842,
(Continued)

(51) Int. Cl.
*H04L 67/10* (2022.01)
*G06F 8/73* (2018.01)
(Continued)

(52) U.S. Cl.
CPC ............ *H04L 67/10* (2013.01); *G06F 8/73* (2013.01); *H04L 67/1004* (2013.01);
(Continued)

(58) Field of Classification Search
None
See application file for complete search history.

(56) References Cited

U.S. PATENT DOCUMENTS

| | | | |
|---|---|---|---|
| 7,788,536 B1 | 8/2010 | Qureshi et al. | |
| 8,625,757 B1 * | 1/2014 | Karpov | H04M 15/00 379/112.06 |

(Continued)

FOREIGN PATENT DOCUMENTS

| | | |
|---|---|---|
| WO | 2008094540 A1 | 8/2008 |
| WO | 2019203785 A1 | 10/2019 |

OTHER PUBLICATIONS

Gamez, D., et al., "Toward SLA-Driven API Gateways," Sep. 2015 (9 pages).
(Continued)

*Primary Examiner* — Joshua Joo
(74) *Attorney, Agent, or Firm* — Perkins Coie LLP; Colin Fowler; Brian Coleman

(57) ABSTRACT

Disclosed embodiments are directed at systems, methods, and architecture for providing auto-documentation to APIs. The auto documentation plugin is architecturally placed between an API and a client thereof and parses API requests and responses in order to generate auto-documentation. In some embodiments, the auto-documentation plugin is used to update preexisting documentation after updates. In some embodiments, the auto-documentation plugin accesses an on-line documentation repository. In some embodiments, the auto-documentation plugin makes use of a machine learning model to determine how and which portions of an existing documentation file to update.

21 Claims, 16 Drawing Sheets

(DISTRIBUTED API GATEWAY)

Related U.S. Application Data which is a continuation-in-part of application No. 16/254,788, filed on Jan. 23, 2019, now abandoned, which is a continuation of application No. 15/974,532, filed on May 8, 2018, now Pat. No. 10,225,330, which is a continuation-in-part of application No. 15/899,529, filed on Feb. 20, 2018, now Pat. No. 10,097,624, which is a continuation of application No. 15/662,539, filed on Jul. 28, 2017, now Pat. No. 9,936,005.

(60) Provisional application No. 62/896,412, filed on Sep. 5, 2019.

(51) Int. Cl.
  *H04L 67/1004* (2022.01)
  *H04L 67/02* (2022.01)
  *H04L 67/01* (2022.01)
  *H04L 67/563* (2022.01)
  *H04L 67/568* (2022.01)

(52) U.S. Cl.
  CPC ............. *H04L 67/01* (2022.05); *H04L 67/02* (2013.01); *H04L 67/563* (2022.05); *H04L 67/568* (2022.05)

(56) References Cited

U.S. PATENT DOCUMENTS

| | | |
|---|---|---|
| 8,756,617 B1 | 6/2014 | Boodman et al. |
| 8,819,629 B2 | 8/2014 | Sherrill |
| 9,027,039 B2 | 5/2015 | Michels et al. |
| 9,577,916 B1 | 2/2017 | Chou et al. |
| 9,602,468 B2 | 3/2017 | Tubi et al. |
| 9,716,617 B1 | 7/2017 | Ahuja et al. |
| 9,936,005 B1 | 4/2018 | Palladino et al. |
| 9,959,363 B2 | 5/2018 | Kaplinger et al. |
| 9,967,285 B1 | 5/2018 | Rossman et al. |
| 10,097,624 B1 | 10/2018 | Palladino et al. |
| 10,225,330 B2 | 3/2019 | Palladino et al. |
| 10,379,838 B1 | 8/2019 | Chud |
| 10,621,005 B2 | 4/2020 | Wong et al. |
| 10,623,390 B1* | 4/2020 | Rosenhouse ............ H04L 67/10 |
| 10,827,020 B1* | 11/2020 | Cao ....................... H04L 67/561 |
| 2004/0070604 A1 | 4/2004 | Bhat et al. |
| 2004/0250176 A1 | 12/2004 | Brown et al. |
| 2005/0027797 A1 | 2/2005 | San Andres et al. |
| 2005/0262475 A1 | 11/2005 | Halpern |
| 2006/0195840 A1 | 8/2006 | Sundarrajan et al. |
| 2007/0002731 A1 | 1/2007 | Misra |
| 2007/0280206 A1 | 12/2007 | Messer et al. |
| 2010/0241846 A1 | 9/2010 | Sundarrajan et al. |
| 2011/0087783 A1 | 4/2011 | Annapureddy et al. |
| 2012/0124647 A1 | 5/2012 | Simula et al. |
| 2013/0132582 A1 | 5/2013 | Kim et al. |
| 2013/0132584 A1 | 5/2013 | Palladino et al. |
| 2013/0227291 A1 | 8/2013 | Ahmed et al. |
| 2014/0040863 A1 | 2/2014 | Hale et al. |
| 2014/0068047 A1 | 3/2014 | Williams et al. |
| 2014/0289699 A1 | 9/2014 | Paterson et al. |
| 2014/0366080 A1 | 12/2014 | Gupta et al. |
| 2015/0301883 A1 | 10/2015 | Talla et al. |
| 2015/0301886 A1 | 10/2015 | Watanabe |
| 2015/0312364 A1 | 10/2015 | Bayliss et al. |
| 2015/0319154 A1 | 11/2015 | Balakrishnan et al. |
| 2015/0350092 A1* | 12/2015 | Kwon .................. H04L 67/561 709/223 |
| 2015/0350341 A1 | 12/2015 | Daute |
| 2016/0048408 A1 | 2/2016 | Madhu et al. |
| 2016/0173578 A1 | 6/2016 | Sharma et al. |
| 2017/0012838 A1 | 1/2017 | Kashtan et al. |
| 2017/0060577 A1 | 3/2017 | Schreiber et al. |
| 2017/0063989 A1 | 3/2017 | Langouev et al. |
| 2017/0124210 A1 | 5/2017 | Suter et al. |
| 2017/0019468 A1 | 6/2017 | Charlton, III et al. |
| 2017/0187835 A1 | 6/2017 | Lim et al. |
| 2017/0206707 A1 | 7/2017 | Guay et al. |
| 2017/0221119 A1 | 8/2017 | Pellow et al. |
| 2017/0242784 A1* | 8/2017 | Heorhiadi ........... G06F 11/3684 |
| 2018/0152310 A1 | 5/2018 | Ansari et al. |
| 2018/0270079 A1 | 9/2018 | Chamarajnager et al. |
| 2018/0349121 A1 | 12/2018 | Bagarolo et al. |
| 2018/0357114 A1 | 12/2018 | O'kennedy et al. |
| 2019/0034199 A1 | 1/2019 | Pollock |
| 2019/0068438 A1 | 2/2019 | Kumar et al. |
| 2019/0273746 A1* | 9/2019 | Coffing .................. G06Q 20/40 |
| 2020/0012785 A1* | 1/2020 | Dykes .................... G06F 21/552 |
| 2020/0112487 A1* | 4/2020 | Inamdar .................. H04L 67/14 |
| 2020/0162380 A1* | 5/2020 | Pilkington .......... H04L 47/2433 |
| 2020/0329114 A1* | 10/2020 | Bahl ...................... H04L 67/10 |
| 2020/0358802 A1* | 11/2020 | Viswambharan ..... G06F 9/5072 |
| 2021/0019194 A1* | 1/2021 | Bahl ...................... G06F 9/3877 |
| 2021/0058484 A1* | 2/2021 | Pilkington ............. H04L 67/60 |
| 2021/0184951 A1* | 6/2021 | Bonas .................... H04L 43/08 |
| 2021/0352139 A1* | 11/2021 | Madisetti .............. H04L 9/3239 |

OTHER PUBLICATIONS

Kong-Open Source API management and Microservice Management, <https:/web.archive.org/web/20160221221135/https://getkong.org/> Feb. 12, 2016 (4 pages).

Mashape, <https://web.archive.org/web/20160721224232/https:/www.mashape.com/> Jul. 21, 2016 (4 pages).

* cited by examiner (DISTRIBUTED API GATEWAY)

AUTO-DOCUMENTATION FOR APPLICATION PROGRAM INTERFACES BASED ON NETWORK REQUESTS AND RESPONSES

CROSS-REFERENCE TO RELATED APPLICATIONS

This application is a continuation-in-part of U.S. patent application Ser. No. 16/254,788, entitled "AUTO-DOCUMENTATION FOR APPLICATION PROGRAM INTERFACES BASED ON NETWORK REQUESTS AND RESPONSES," filed Jan. 23, 2019, which is a continuation of U.S. patent application Ser. No. 15/974,532, entitled "AUTO-DOCUMENTATION FOR APPLICATION PROGRAM INTERFACES BASED ON NETWORK REQUESTS AND RESPONSES," filed May 8, 2018, now U.S. Pat. No. 10,225,330, issued Mar. 5, 2019, which is a continuation-in-part of U.S. patent application Ser. No. 15/899,529, entitled "SYSTEMS AND METHODS FOR DISTRIBUTED INSTALLATION OF API AND PLUGINS," filed on Feb. 20, 2018, now U.S. Pat. No. 10,097,624, issued Oct. 9, 2018 that is, in turn, a continuation application of U.S. patent application Ser. No. 15/662,539 entitled "SYSTEMS AND METHODS FOR DISTRIBUTED API GATEWAYS," filed on Jul. 28, 2017, now U.S. Pat. No. 9,936,005, issued Apr. 3, 2018. The aforementioned applications are incorporated herein by reference in their entirety.

BACKGROUND

Application programming interfaces (APIs) are specifications primarily used as an interface platform by software components to enable communication with each other. For example, APIs can include specifications for clearly defined routines, data structures, object classes, and variables. Thus, an API defines what information is available and how to send or receive that information.

Setting up multiple APIs is a time-consuming challenge. This is because deploying an API requires tuning the configuration or settings of each API individually. The functionalities of each individual API are confined to that specific API and servers hosting multiple APIs are individually set up for hosting the APIs, this makes it very difficult to build new APIs or even scale and maintain existing APIs. This becomes even more challenging when there are tens of thousands of APIs and millions of clients requesting API-related services per day. These same tens of thousands of APIs are updated regularly. Consequently, updating the associated documentation with these APIs is a tedious and cumbersome activity. Consequently, this results in reduced system productivity.

DETAILED DESCRIPTION

Figure 1A:
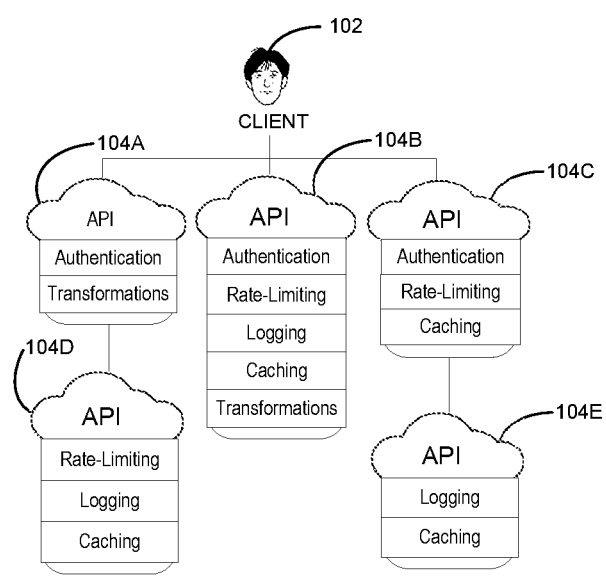
FIG. 1A illustrates a prior art approach with multiple APIs having functionalities common to one another.

The disclosed technology describes how to automatically generate or update documentation for an API by monitoring, parsing, and sniffing requests/responses to/from the API through network nodes such as proxy servers, gateways, and control planes. In network routing and microservices applications, the control plane is the part of the router architecture that is concerned with drawing the network topology, or the routing table that defines what to do with incoming packets. Control plane logic also can define certain packets to be discarded, as well as preferential treatment of certain packets for which a high quality of service is defined by such mechanisms as differentiated services.

In monolithic application architecture, a control plane operates outside the core application. In a microservices architecture, the control plane operates between each API that makes up the microservice architecture. Proxies operate linked to each API. The proxy attached to each API is referred to as a "data plane proxy." Examples of a data plane proxy include the sidecar proxies of Envoy proxies.

The generation or updates of documentation are implemented in a number of ways and based on a number of behavioral indicators described herein.

The following description and drawings are illustrative and are not to be construed as limiting. Numerous specific details are described to provide a thorough understanding of the disclosure. However, in certain instances, well-known or conventional details are not described in order to avoid obscuring the description. References to an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure are directed at systems, methods, and architecture for providing microservices and a plurality of APIs to requesting clients. The architecture is a distributed cluster of gateway nodes that jointly provide microservices and the plurality of APIs. Providing the APIs includes providing a plurality of plugins that implement the APIs. As a result of a distributed architecture, the task of API management can be distributed across a cluster of gateway nodes. Every request being made to an API hits a gateway node first, and then the request is proxied to the target API. The gateway nodes effectively become the entry point for every API-related request. The disclosed embodiments are well-suited for use in mission critical deployments at small and large organizations. Aspects of the disclosed technology do not impose any limitation on the type of APIs. For example, these APIs can be proprietary APIs, publicly available APIs, or invite-only APIs.

FIG. 1A illustrates a prior art approach with multiple APIs having functionalities common to one another. As shown in FIG. 1A, a client 102 is associated with APIs 104A, 104B, 104C, 104D, and 104E. Each API has a standard set of features or functionalities associated with it. For example, the standard set of functionalities associated with API 104A are "authentication" and "transformations." The standard set of functionalities associated with API 104B are "authentication," "rate-limiting," "logging," "caching," and "transformations." Thus, "authentication" and "transformations" are functionalities that are common to APIs 104A and 104B. Similarly, several other APIs in FIG. 1A share common functionalities. However, it is noted that having each API handle its own functionalities individually causes duplication of efforts and code associated with these functionalities, which is inefficient. This problem becomes significantly more challenging when there are tens of thousands of APIs and millions of clients requesting API-related services per day.

Figure 1B:
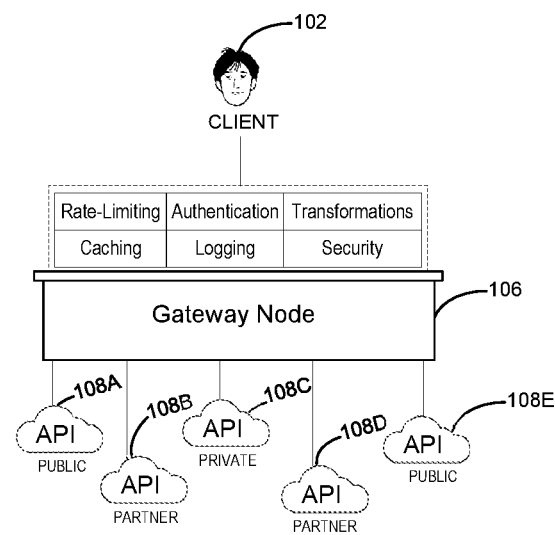
FIG. 1B illustrates a distributed API gateway architecture, according to an embodiment of the disclosed technology.

FIG. 1B illustrates a distributed API gateway architecture according to an embodiment of the disclosed technology. To address the challenge described in connection with FIG. 1A, the disclosed technology provides a distributed API gateway architecture as shown in FIG. 1B. Specifically, disclosed embodiments implement common API functionalities by bundling the common API functionalities into a gateway node 106 (also referred to herein as an API Gateway). Gateway node 106 implements common functionalities as a core set of functionalities that runs in front of APIs 108A, 108B, 108C, 108D, and 108E. The core set of functionalities include rate limiting, caching, authentication, logging, transformations, and security. It will be understood that the above-mentioned core set of functionalities are for examples and illustrations. There can be other functionalities included in the core set of functionalities besides those discussed in FIG. 1B. In some applications, gateway node 106 can help launch large-scale deployments in a very short time at reduced complexity and is therefore an inexpensive replacement for expensive proprietary API management systems. The disclosed technology includes a distributed architecture of gateway nodes with each gateway node bundled with a set of functionalities that can be extended depending on the use-case or applications.

Figure 2:
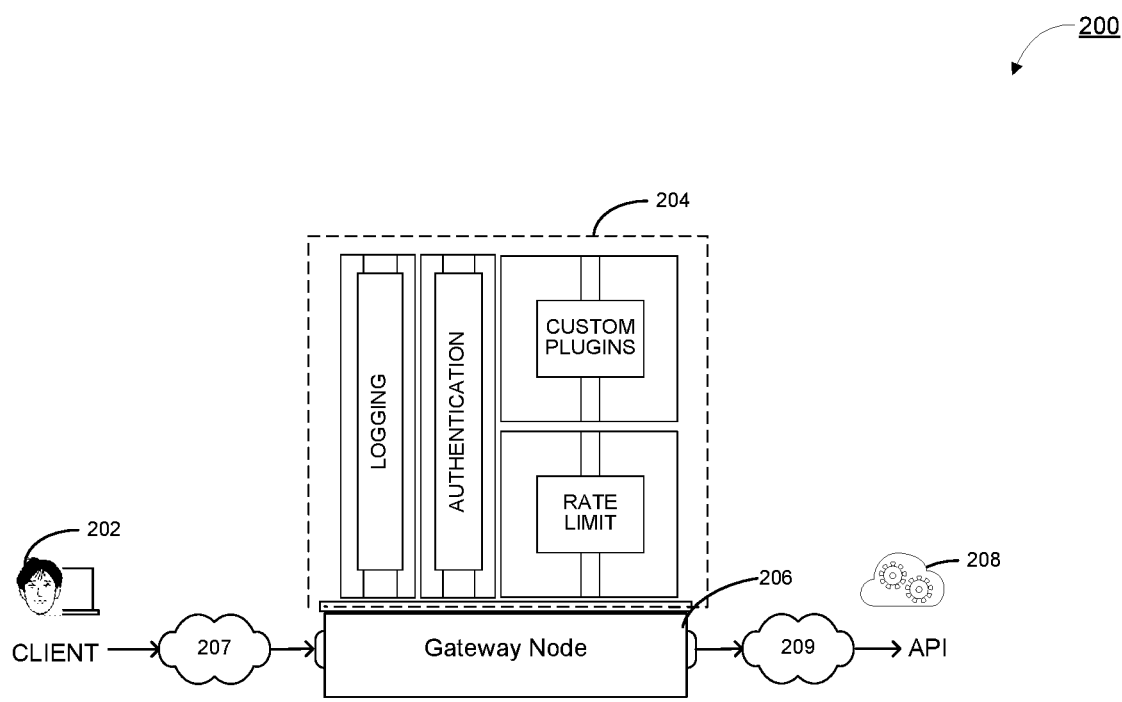
FIG. 2 illustrates a block diagram of an example environment suitable for functionalities provided by a gateway node, according to an embodiment of the disclosed technology.

FIG. 2 illustrates a block diagram of an example environment suitable for functionalities provided by a gateway node according to an embodiment of the disclosed technology. In some embodiments, a core set of functionalities are provided in the form of "plugins" or "add-ons" installed at a gateway node. (Generally, a plugin is a component that allows modification of what a system can do usually without forcing a redesign/compile of the system. When an application supports plug-ins, it enables customization. The common examples are the plug-ins used in web browsers to add new features such as search-engines, virus scanners, or the ability to utilize a new file type such as a new video format.)

As an example, a set of plugins 204 shown in FIG. 2 are provided by gateway node 206 positioned between a client 202 and one or more HTTP APIs. Electronic devices operated by client 202 can include, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone or Droid device, etc. Gateway node 206 and client 202 are configured to communicate with each other via network 207. Gateway node 206 and one or more APIs 208 are configured to communicate with each other via network 209. In some embodiments, the one or more APIs reside in one or more API servers, API data stores, or one or more API hubs. Various combinations of configurations are possible.

Networks 207 and 209 can be any collection of distinct networks operating wholly or partially in conjunction to provide connectivity to/from client 202 and one or more APIs 208. In one embodiment, network communications can be achieved by, an open network, such as the Internet, or a private network, such as an intranet and/or the extranet. Networks 207 and 209 can be a telephonic network, an open network, such as the Internet, or a private network, such as an intranet and/or the extranet. For example, the Internet can provide file transfer, remote login, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc.

Client 202 and one or more APIs 208 can be coupled to the network 150 (e.g., Internet) via a dial-up connection, a digital subscriber loop (DSL, ADSL), cable modem, wireless connections, and/or other types of connection. Thus, the client devices 102A-N, 112A-N, and 122A-N can communicate with remote servers (e.g., API servers 130A-N, hub servers, mail servers, instant messaging servers, etc.) that provide access to user interfaces of the World Wide Web via a web browser, for example.

The set of plugins 204 include authentication, logging, rate-limiting, and custom plugins, of which authentication, logging, traffic control, rate-limiting can be considered as the core set of functionalities. An authentication functionality can allow an authentication plugin to check for valid login credentials such as usernames and passwords. A logging functionality of a logging plugin logs data associated with requests and responses. A traffic control functionality of a traffic control plugin manages, throttles, and restricts inbound and outbound API traffic. A rate limiting functionality can allow managing, throttling, and restricting inbound and outbound API traffic. For example, a rate limiting plugin can determine how many HTTP requests a developer can make in a given period of seconds, minutes, hours, days, months or years.

A plugin can be regarded as a piece of stand-alone code. After a plugin is installed at a gateway node, it is available to be used. For example, gateway node 206 can execute a plugin in between an API-related request and providing an associated response to the API-related request. One advantage of the disclosed system is that the system can be expanded by adding new plugins. In some embodiments, gateway node 206 can expand the core set of functionalities by providing custom plugins. Custom plugins can be provided by the entity that operates the cluster of gateway nodes. In some instances, custom plugins are developed (e.g., built from "scratch") by developers or any user of the disclosed system. It can be appreciated that plugins, used in accordance with the disclosed technology, facilitate in centralizing one or more common functionalities that would be otherwise distributed across the APIs, making it harder to build, scale and maintain the APIs.

Other examples of plugins can be a security plugin, a monitoring and analytics plugin, and a transformation plugin. A security functionality can be associated with the system restricting access to an API by whitelisting or blacklisting/whitelisting one or more consumers identified, for example, in one or more Access Control Lists (ACLs). In some embodiments, the security plugin requires an authentication plugin to be enabled on an API. In some use cases, a request sent by a client can be transformed or altered before being sent to an API. A transformation plugin can apply a transformations functionality to alter the request sent by a client. In many use cases, a client might wish to monitor request and response data. A monitoring and analytics plugin can allow monitoring, visualizing, and inspecting APIs and microservices traffic.

In some embodiments, a plugin is Lua code that is executed during the life-cycle of a proxied request and response. Through plugins, functionalities of a gateway node can be extended to fit any custom need or integration challenge. For example, if a consumer of the disclosed system needs to integrate their API's user authentication with a third-party enterprise security system, it can be implemented in the form of a dedicated (custom) plugin that is run on every request targeting that given API. One advantage, among others, of the disclosed system is that the distributed cluster of gateway nodes is scalable by simply adding more nodes, implying that the system can handle virtually any load while keeping latency low.

One advantage of the disclosed system is that it is platform agnostic, which implies that the system can run anywhere. In one implementation, the distributed cluster can be deployed in multiple data centers of an organization. In some implementations, the distributed cluster can be deployed as multiple nodes in a cloud environment. In some implementations, the distributed cluster can be deployed as a hybrid setup involving physical and cloud computers. In some other implementations, the distributed cluster can be deployed as containers.

Figure 3A:
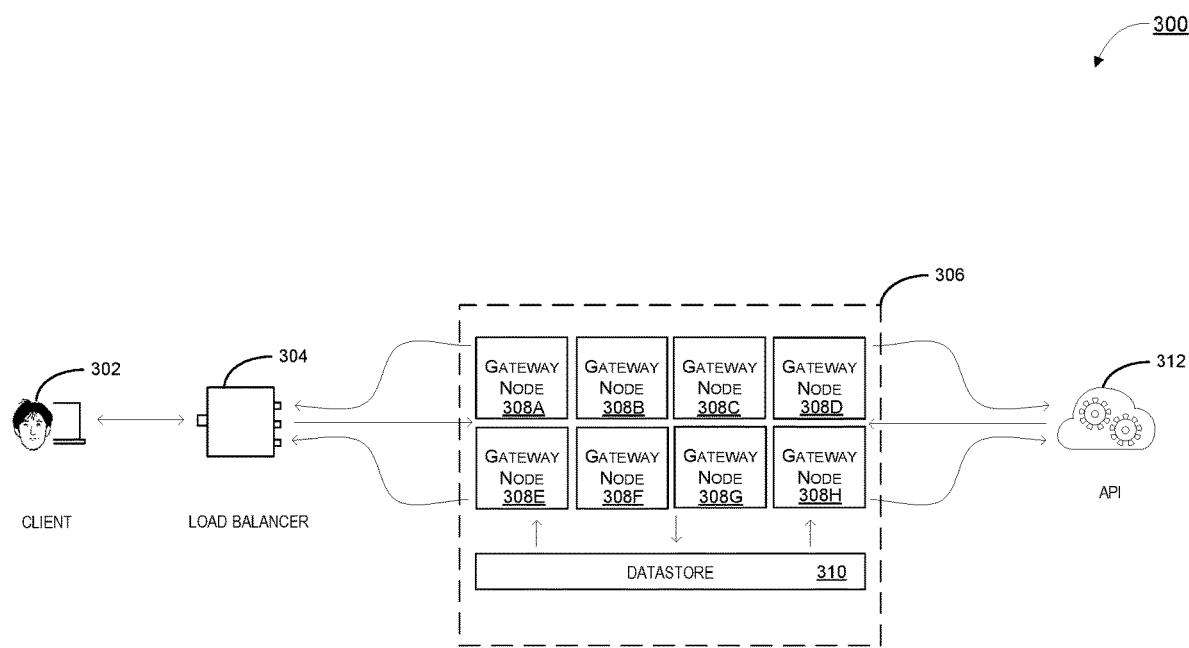
FIG. 3A illustrates a block diagram of an example environment with a cluster of gateway nodes in operation, according to an embodiment of the disclosed technology.

FIG. 3A illustrates a block diagram of an example environment with a cluster of gateway nodes in operation. In some embodiments, a gateway node is built on top of NGINX. NGINX is a high-performance, highly-scalable, highly-available web server, reverse proxy server, and web accelerator (combining the features of an HTTP load balancer, content cache, and other features). In an example deployment, a client 302 communicates with one or more APIs 312 via load balancer 304, and a cluster of gateway nodes 306. The cluster of gateway nodes 306 can be a distributed cluster. The cluster of gateway nodes 306 includes gateway nodes 308A-308H and data store 310. The functions represented by the gateway nodes 308A-308H and/or the data store 310 can be implemented individually or in any combination thereof, partially or wholly, in hardware, software, or a combination of hardware and software.

Load balancer 304 provides functionalities for load balancing requests to multiple backend services. In some embodiments, load balancer 304 can be an external load balancer. In some embodiments, the load balancer 304 can be a DNS-based load balancer. In some embodiments, the load balancer 304 can be a Kubernetes® load balancer integrated within the cluster of gateway nodes 306.

Data store 310 stores all the data, routing information, plugin configurations, etc. Examples of a data store can be Apache Cassandra or PostgreSQL. In accordance with disclosed embodiments, multiple gateway nodes in the cluster share the same data store, e.g., as shown in FIG. 3A. Because multiple gateway nodes in the cluster share the same data store, there is no requirement to associate a specific gateway node with the data store—data from each gateway node 308A-308H is stored in data store 310 and retrieved by the other nodes (e.g., even in complex multiple data center setups). In some embodiments, the data store shares configurations and software codes associated with a plugin that is installed at a gateway node. In some embodiments, the plugin configuration and code can be loaded at runtime.

Figure 3B:
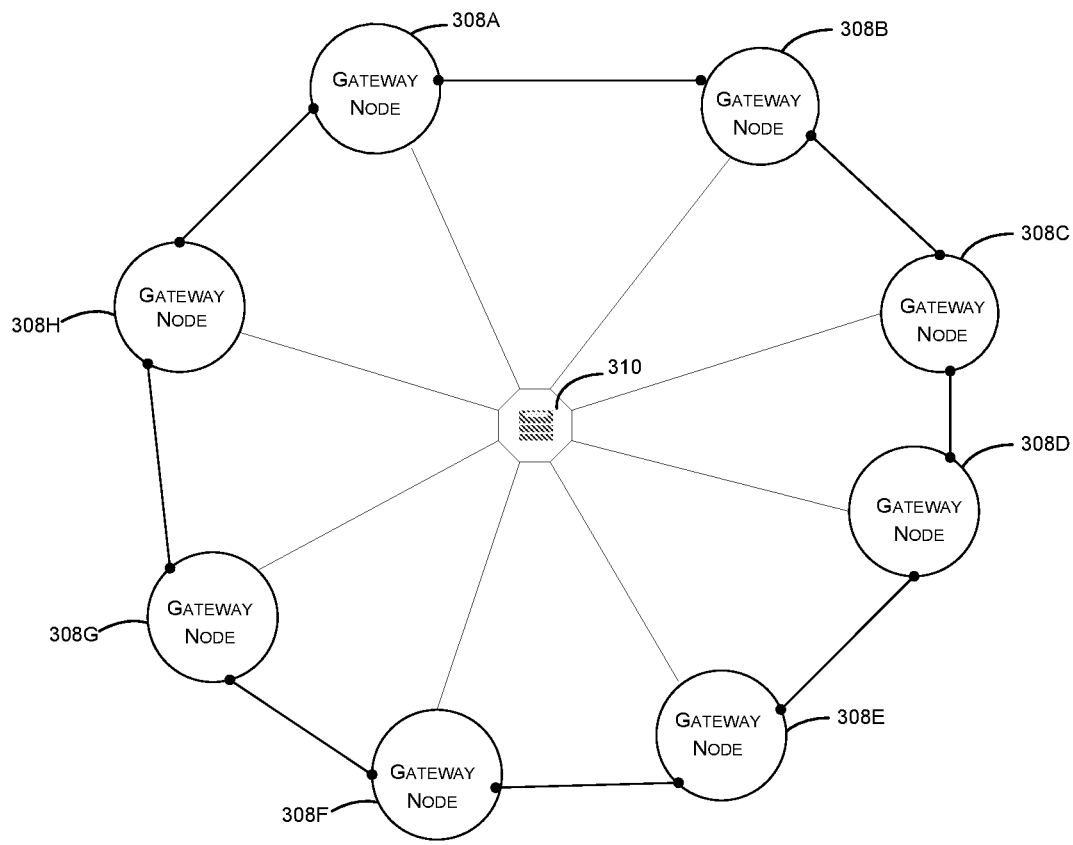
FIG. 3B illustrates a schematic of a data store shared by multiple gateway nodes, according to an embodiment of the disclosed technology.

FIG. 3B illustrates a schematic of a data store shared by multiple gateway nodes, according to an embodiment of the disclosed technology. For example, FIG. 3B shows data store 310 shared by gateway nodes 308A-308H arranged as part of a cluster.

One advantage of the disclosed architecture is that the cluster of gateway nodes allow the system to be scaled horizontally by adding more gateway nodes to encompass a bigger load of incoming API-related requests. Each of the gateway nodes share the same data since they point to the same data store. The cluster of gateway nodes can be created in one datacenter, or in multiple datacenters distributed across different geographical locations, in both cloud or on-premise environments. In some embodiments, gateway nodes (e.g., arranged according to a flat network topology) between the datacenters communicate over a Virtual Private Network (VPN) connection. The system can automatically handle a new gateway node joining a cluster or leaving a cluster. Once a gateway node communicates with another gateway node, it will automatically discover all the other gateway nodes due to an underlying gossip protocol.

In some embodiments, each gateway includes an administration API (e.g., internal RESTful API) for administration purposes. Requests to the administration API can be sent to any node in the cluster. The administration API can be a generic HTTP API. Upon set up, each gateway node is associated with a consumer port and an admin port that manages the API-related requests coming into the consumer port. For example, port number 8001 is the default port on which the administration API listens and 8444 is the default port for HTTPS (e.g., admin_listen_ssl) traffic to the administration API.

In some instances, the administration API can be used to provision plugins. After a plugin is installed at a gateway node, it is available to be used, e.g., by the administration API or a declarative configuration.

In some embodiments, the administration API identifies a status of a cluster based on a health state of each gateway node. For example, a gateway node can be in one of the following states:
  active: the node is active and part of the cluster.
  failed: the node is not reachable by the cluster.
  leaving: a node is in the process of leaving the cluster.
  left: the node has left the cluster.

In some embodiments, the administration API is an HTTP API available on each gateway node that allows the user to create, restore, update, and delete (CRUD) operations on items (e.g., plugins) stored in the data store. For example, the Admin API can provision APIs on a gateway node, provision plugin configuration, create consumers, and provision their credentials. In some embodiments, the administration API can also read, update, or delete the data. Generally, the administration API can configure a gateway node and the data associated with the gateway node in the data store.

In some applications, it is possible that the data store only stores the configuration of a plugin and not the software code of the plugin. That is, for installing a plugin at a gateway node, the software code of the plugin is stored on that gateway node. This can result in efficiencies because the user needs to update his or her deployment scripts to include the new instructions that would install the plugin at every gateway node. The disclosed technology addresses this issue by storing both the plugin and the configuration of the plugin. By leveraging the administration API, each gateway node can not only configure the plugins, but also install them. Thus, one advantage of the disclosed system is that a user does not have to install plugins at every gateway node. But rather, the administration API associated with one of the gateway nodes automates the task of installing the plugins at gateway nodes by installing the plugin in the shared data store, such that every gateway node can retrieve the plugin code and execute the code for installing the plugins. Because the plugin code is also saved in the shared data store, the code is effectively shared across the gateway nodes by leveraging the data store, and does not have to be individually installed on every gateway node.

Figure 4A:
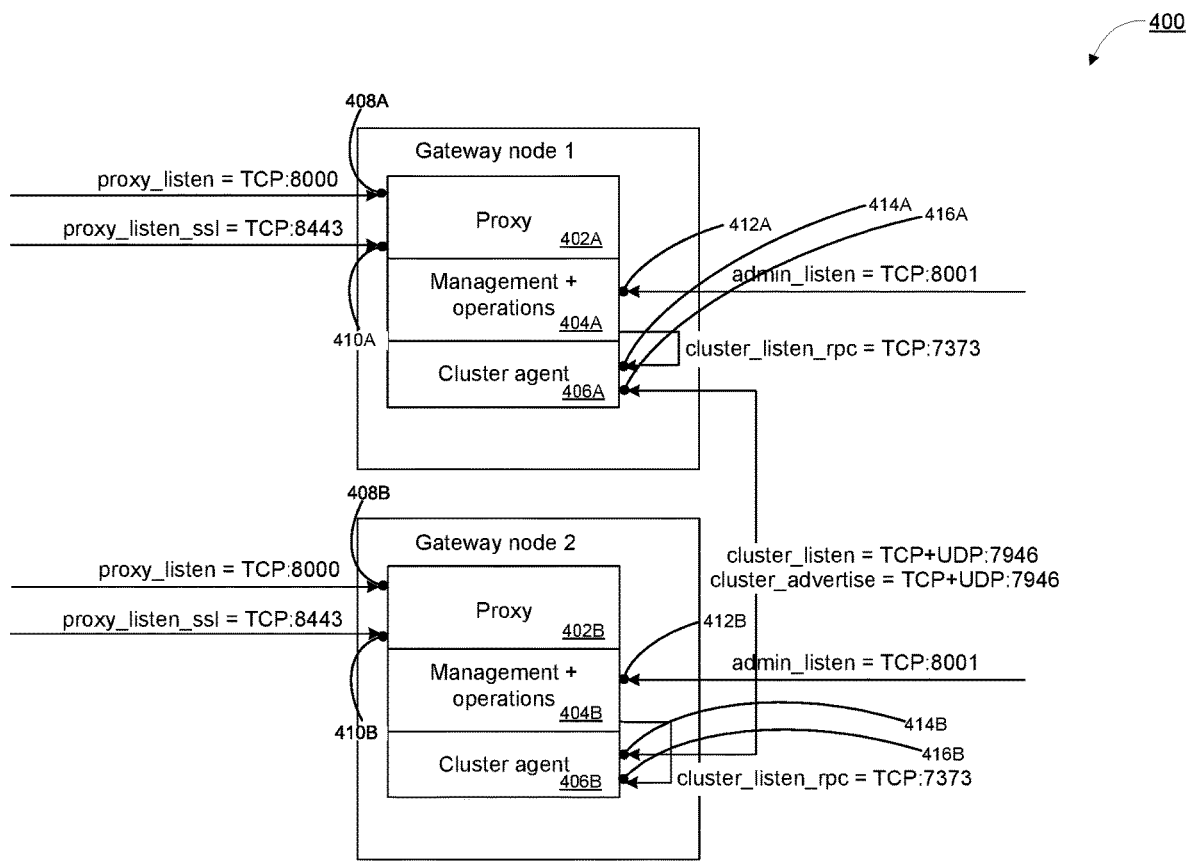
FIG. 4A and FIG. 4B illustrate example ports and connections of a gateway node, according to an embodiment of the disclosed technology.
Figure 4B:
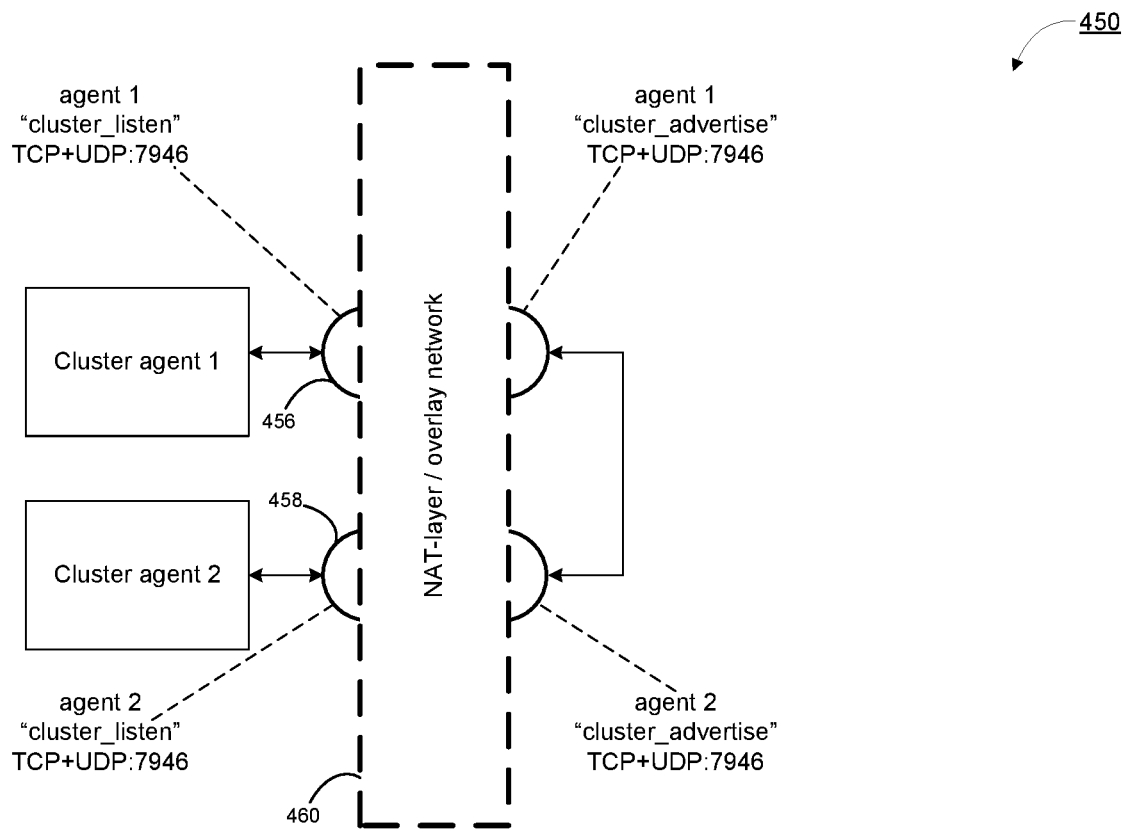

FIG. 4A and FIG. 4B illustrate example block diagrams 400 and 450 showing ports and connections of a gateway node, according to an embodiment of the disclosed technology. Specifically, FIG. 4A shows a gateway node 1 and gateway node 2. Gateway node 1 includes a proxy module 402A, a management and operations module 404A, and a cluster agent module 406A. Gateway node 2 includes a proxy module 402B, a management and operations module 404B, and a cluster agent module 406B. Gateway node 1 receive incoming traffic at ports denoted as 408A and 410A. Ports 408A and 410A are coupled to proxy module 402B. Gateway node 1 listens for HTTP traffic at port 408A. The default port number for port 408A is 8000. API-related requests are typically received at port 408A. Port 410A is used for proxying HTTPS traffic. The default port number for port 410A is 8443. Gateway node 1 exposes its administration API (alternatively, referred to as management API) at port 412A that is coupled to management and operations module 404A. The default port number for port 412A is 8001. The administration API allows configuration and management of a gateway node, and is typically kept private and secured. Gateway node 1 allows communication within itself (i.e., intra-node communication) via port 414A that is coupled to clustering agent module 406A. The default port number for port 414A is 7373. Because the traffic (e.g., TCP traffic) here is local to a gateway node, this traffic does not need to be exposed. Cluster agent module 406B of gateway node 1 enables communication between gateway node 1 and other gateway nodes in the cluster. For example, ports 416A and 416B coupled with cluster agent module 406A at gateway node 1 and cluster agent module 406B at gateway node 2 allow intra-cluster or inter-node communication. Intra-cluster communication can involve UDP and TCP traffic. Both ports 416A and 416B have the default port number set to 7946. In some embodiments, a gateway node automatically (e.g., without human intervention) detects its ports and addresses. In some embodiments, the ports and addresses are advertised (e.g., by setting the cluster_advertise property/setting to a port number) to other gateway nodes. It will be understood that the connections and ports (denoted with the numeral "B") of gateway node 2 are similar to those in gateway node 1, and hence is not discussed herein.

FIG. 4B shows cluster agent 1 coupled to port 456 and cluster agent 2 coupled to port 458. Cluster agent 1 and cluster agent 2 are associated with gateway node 1 and gateway node 2 respectively. Ports 456 and 458 are communicatively connected to one another via a NAT-layer 460. In accordance with disclosed embodiments, gateway nodes are communicatively connected to one another via a NAT-layer. In some embodiments, there is no separate cluster agent but the functionalities of the cluster agent are integrated into the gateway nodes. In some embodiments, gateway nodes communicate with each other using the explicit IP address of the nodes.

Figure 5:
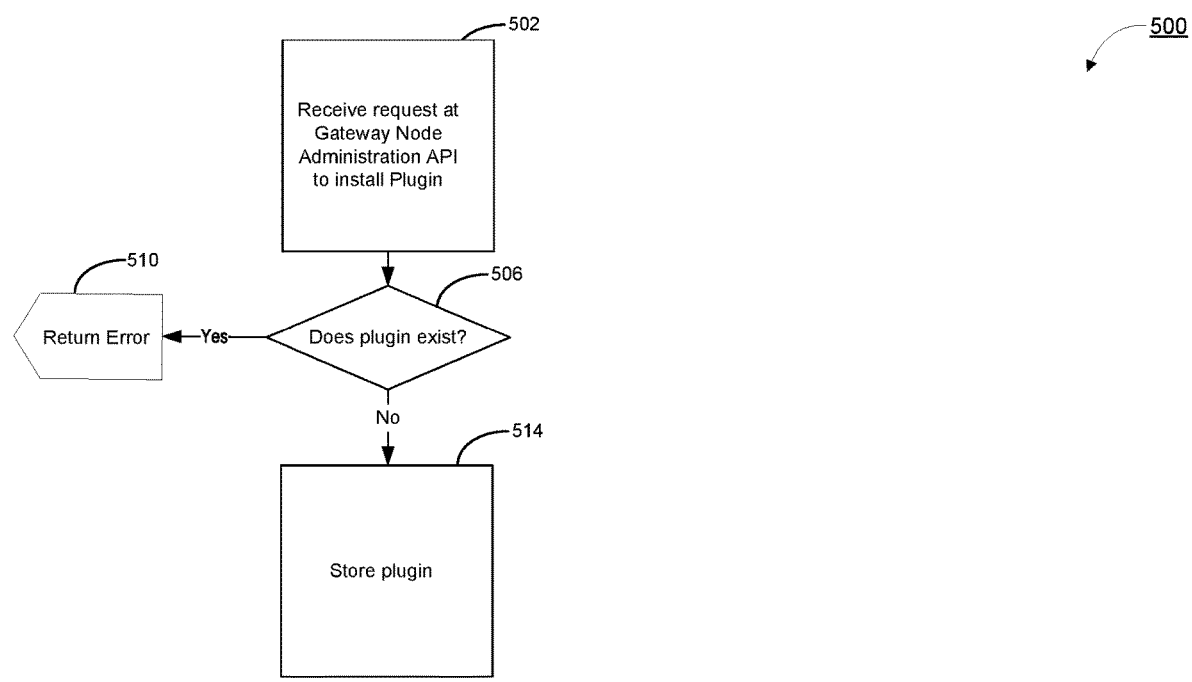
FIG. 5 illustrates a flow diagram showing steps involved in the installation of a plugin at a gateway node, according to an embodiment of the disclosed technology.

FIG. 5 illustrates a flow diagram showing steps of a process 500 involved in installation of a plugin at a gateway node, according to an embodiment of the disclosed technology. At step 502, the administration API of a gateway node receives a request to install a plugin. An example of a request is provided below:

```
For example:
POST /plugins/install
name=OPTIONAL_VALUE
code=VALUE
archive=VALUE
```

The administration API of the gateway node determines (at step 506) if the plugin exists in the data store. If the gateway node determines that the plugin exists in the data store, then the process returns (step 510) an error. If the gateway node determines that the plugin does not exist in the data store, then the process stores the plugin. (In some embodiments, the plugin can be stored in an external data store coupled to the gateway node, a local cache of the gateway node, or a third party storage. For example, if the plugin is stored at some other location besides the data store, then different policies can be implemented for accessing the plugin.) Because the plugin is now stored in the database, it is ready to be used by any gateway node in the cluster.

When a new API request goes through a gateway node (in the form of network packets), the gateway node determines (among other things) which plugins are to be loaded. Therefore, a gateway node sends a request to the data store to retrieve the plugin(s) that has/have been configured on the API and that need(s) to be executed. The gateway node communicates with the data store using the appropriate database driver (e.g., Cassandra or PostgresSQL) over a TCP communication. In some embodiments, the gateway node retrieves both the plugin code to execute and the plugin configuration to apply for the API, and then execute them at runtime on the gateway node (e.g., as explained in FIG. 6).

Figure 6:
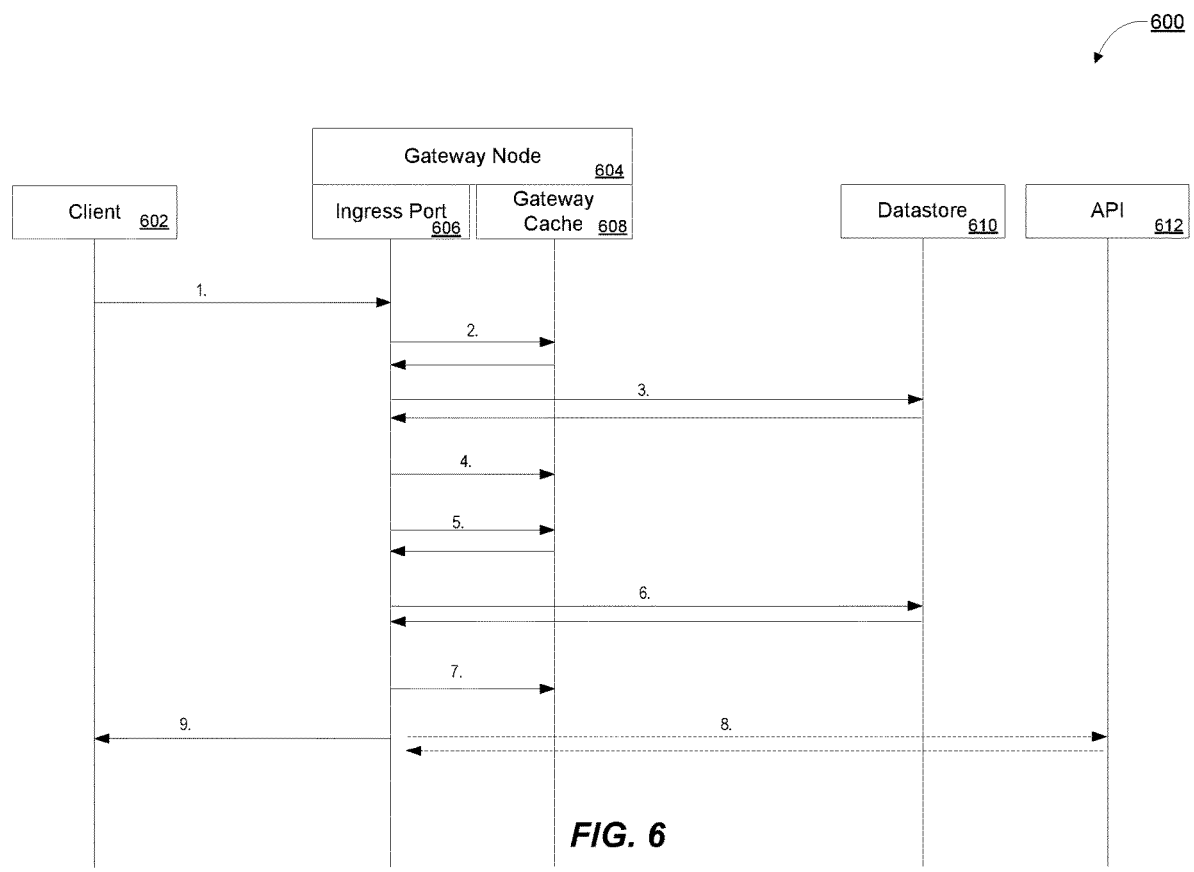
FIG. 6 illustrates a sequence diagram showing components and associated steps involved in loading configurations and code at runtime, according to an embodiment of the disclosed technology.

FIG. 6 illustrates a sequence diagram 600 showing components and associated steps involved in loading configurations and code at runtime, according to an embodiment of the disclosed technology. The components involved in the interaction are client 602, gateway node 604 (including an ingress port 606 and a gateway cache 608), data store 610, and an API 612. At step 1, a client makes a request to gateway node 604. At step 2, ingress port 606 of gateway node 604 checks with gateway cache 608 to determine if the plugin information and the information to process the request has already been cached previously in gateway cache 608. If the plugin information and the information to process the request is cached in gateway cache 608, then the gateway cache 608 provides such information to the ingress port 606. If, however, the gateway cache 608 informs the ingress port 606 that the plugin information and the information to process the request is not cached in gateway cache 608, then the ingress port 606 loads (at step 3) the plugin information and the information to process the request from data store 610. In some embodiments, ingress port 606 caches (for subsequent requests) the plugin information and the information to process the request (retrieved from data store 610) at gateway cache 608. At step 5, ingress port 606 of gateway node 604 executes the plugin and retrieves the plugin code from the cache, for each plugin configuration.

However, if the plugin code is not cached at the gateway cache 608, the gateway node 604 retrieves (at step 6) the plugin code from data store 610 and caches (step 7) it at gateway cache 608. The gateway node 604 executes the plugins for the request and the response (e.g., by proxy the request to API 612 at step 7), and at step 8, the gateway node 604 returns a final response to the client.

Auto-Documentation Embodiment

When releasing an API, documentation is a requisite in order for developers to learn how to consume the API. Documentation for an API is an informative text document that describes what functionality the API provides, the parameters it takes as input, what is the output of the API, how does the API operate, and other such information. Usually documenting APIs can be a tedious and extensive task. In conventional systems, developers create an API and draft the documentation for the API. This approach to drafting a documentation for the API is human-driven. That is, the documentation is changed only when human developers make changes to the documentation.

Any time the API is updated, the documentation needs to be revised. In many instances, because of pressures in meeting deadlines, developers are not able to edit the documentation at the same pace as the changes to the API. This results in the documentation not being updated which leads to frustrations because of an API having unsupported/incorrect documentation. In some unwanted scenarios, the documentation does not match the implementation of the API. The issue of documentation is exacerbated in a microservices application that includes a large number of APIs that are independently updated and developed.

The generic concept of procedurally documentation generated from source code emerged recently, though has some inherent issues that are solved herein. Procedurally generated documentation often is limited to activation by the programmer who generates the source code or updates thereto. Techniques taught herein enable the auto-documentation of code that a user does not necessarily have access to. Further, the auto-documentation is performed passively by a network node and does not burden the machine that is executing the API code; thus, a processing advantage is achieved.

In some embodiments, the disclosed system includes a specialized plugin that automatically generates documentation for an API endpoint (e.g., input and output parameters of the API endpoint) without human intervention. By parsing the stream of requests and the responses passing through a gateway node, the plugin generates the documentation automatically. In some embodiments, the auto-documentation plugin is linked to an online repository of documentation, such as GitHub, and documentation files stored thereon are updated directly using provided login credentials where necessary. As an example, if a client sends a request to/hello, and the API associated with/hello responds back with code successfully, then the plugin determines that/hello is an endpoint based on the behavioral indicator of the manner of the response. Further behavioral indicators are discussed below. In some embodiments, an API and a client may have a certain order or series of requests and responses. The API or client will first request one set of parameters, and then based on the response, another request is sent based on the values of those parameters.

In some embodiments, the plugin can parse the parameters involved in a request/response and identify those parameters in the generated auto-documentation. In some embodiments, the plugin can generate a response to a client's request. In some embodiments, the API itself can provide additional response headers (e.g., specifying additional about the fields, parameters, and endpoints) to generate a more comprehensive auto-documentation. For example, a client makes a request to/hello with the parameters name, age, and id. The parameters are titled such that a semantic analysis of the collection of parameter titles are identifying a person.

In some embodiments the auto-documentation plugin can build a model using machine learning to predict what a field in the response means or that a sequence of request/responses has changed. By generating auto-documentation for one or more APIs, the auto-documentation plugin can learn to deal with fields and data that are not necessarily intuitive and compare to historical models. The plugin could therefore build a machine learning or neural net model that can be leveraged to be more accurate over time, and document more accurately. The machine learning model could be hosted locally within a gateway node, or can be sent to a remote (e.g., physical or cloud) server for further refinements.

According to the disclosed auto-documentation plugin, the API provides an endpoint for the plugin to consume so that the auto-documentation plugin can obtain specific information about fields that are not obvious. For example, a "name of an entity" field that is associated with the API may be obvious, but some other fields may not be obvious. Hypothetically, a response includes an "abcd_id" field whose meaning may not be automatically inferred by a gateway node or control plane/data plane proxy, or which might be of interest for documentation purposes. In some embodiments, the auto-documentation generated can be specifically associated with the "abcd_id" field. The "abcd_id" field-specific documentation can be created when the user configures the auto-documentation plugin the first time. In some embodiments, the generated auto-documentation can be retrieved by a third-party source (e.g., another API). In some embodiments, the generated auto-documentation can be retrieved by a custom response header that the API endpoint returns to a gateway node or control plane/data plane proxy.

The purpose of the "abcd_id" field can be inferred based on both a history of response values to the parameter, and a history of many APIs that use a similarly named parameter. For example, if responses consistently include values such as "Main St.", "74th Ln.", "Page Mill Rd.", and "Crossview Ct.", it can be inferred that "abcd_id" is being used to pass names of streets to and from the related API. This history may be observed across multiple APIs. For example, while "abcd_id" may not be intuitively determined, a given programmer or team of programmers may always use the parameters named as such for particular input types (such as street names). Thus, the auto-documentation plugin can update documentation for an API receiving a new (or updated) parameter based on what that parameter means to other APIs.

Where the response values to the request change to "John Smith", "Jane Doe", and "Barack Obama", then the model infers that the use of "abcd_id" has changed from names of streets to names of people. The auto-documentation plugin locates the portion of the documentation that refers to the parameter and updates the description of the use of the parameter.

Where an API and a client may have a certain order or series of requests and responses. A machine learning model is constructed based on the order of requests/responses using the values provided for the parameters to develop the model. For example, a historical model of a request/response schema shows 3 types of requests. First, a request with a string parameter "petType". In responses to the first request, if the value is responded as "dog", the subsequent request asks for the string parameter "favToy". If the response to the first request is "cat", the subsequent request asks for a Boolean parameter "isViolent" instead.

If a newly observed series of requests/responses instead subsequently requests for the string parameter "favToy" after the response to the first request is "cat", then the auto-documentation plugin determines that a method that evaluates the first request has changed and that the related documentation needs to be updated.

The auto-generated documentation is in a human-readable format so that developers can understand and consume the API. When the API undergoes changes or when the request/response (e.g., parameters included in the request/response) to the API undergoes changes, the system not only auto-generates documentation but also detects changes to the request/response. Detecting the changes enables the plugin to be able to alert/notify developers when API-related attributes change (e.g., in an event when the API is updated so that a field is removed from the API's response or a new field is added in the API's response) and send the updated auto-documentation. Thus, the documentation continually evolves over time.

In some embodiments, auto-documentation for an API is generated dynamically in real-time by monitoring/sniffing/parsing traffic related to requests (e.g., sent by one or more clients) and requests (e.g., received from the API). In some embodiments, the client can be a testing client. The client might have a test suite that the client intends to execute. If the client executes the test suite through a gateway node that runs the auto-documentation plugin, then the plugin can automatically generate the documentation for the test suite.

The auto-documentation output, for example, can be a Swagger file that includes each endpoint, each parameter, each method/class and other API-related attributes. (A Swagger file is typically in JSON.) Thus, the auto-documentation can be in other suitable formats, e.g., RAML and API Blueprint. In some embodiments, the auto-documentation functionality is implemented as a plugin (that runs as middleware) at a gateway node.

In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

In some instances, the auto-documentation can be stored or appended to an existing documentation, in-memory, on disk, in a data store or into a third-party service. In some instances, the auto-documentation can be analyzed and compared with previous versions of the same documentation to generate DIFF (i.e., difference) reports, notifications and monitoring alerts if something has changed or something unexpected has been documented.

In some embodiments, the plugin for automatically generating the documentation can artificially provoke or induce traffic (e.g., in the form of requests and responses) directed at an API so that the plugin can learn how to generate the auto-documentation for that API.

Figure 7:
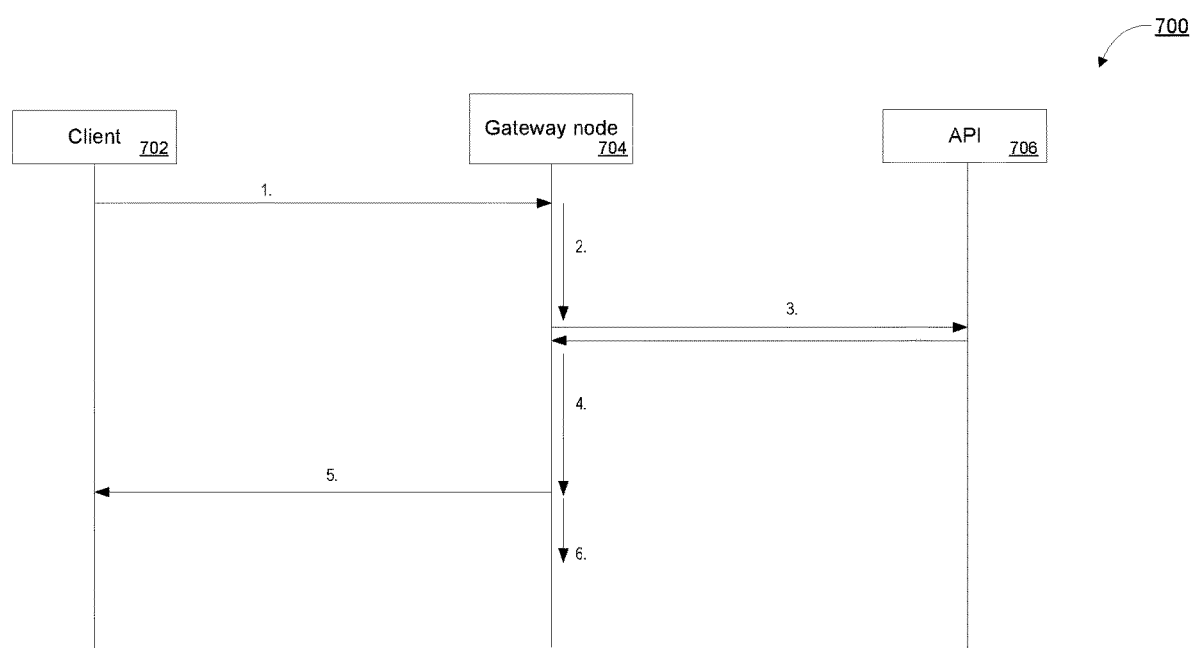
FIG. 7 illustrates a sequence diagram of a use-case showing components and associated steps involved in generating auto-documentation, according to an embodiment of the disclosed technology.

FIG. 7 illustrates a sequence diagram 700 of a use-case showing components and associated steps involved in generating auto-documentation, according to an embodiment of the disclosed technology. Specifically, FIG. 7 corresponds to the use-case when the auto-documentation is generated based on pre-processing a request (e.g., sent by one or more clients) and post-processing a response (e.g., received from the API). The components involved in the interaction are a client 702, a control plane 704, and an API 706. At step 1, a client 702 makes a request to gateway node 704. At step 2, the gateway node 704 parses the request (e.g., the headers and body of the request) and generates auto-documentation associated with the request. (The request can be considered as one part of a complete request/response transaction.)

At step 3, the gateway node 704 proxies/load-balances the request to API 706, which returns a response. At step 4, the gateway node 704 parses the response (e.g., the headers and body of the response) returned by the API 706, and generates auto-documentation associated with the response. In some embodiments, the auto-documentation associated with the response is appended to the auto-documentation associated with the request. At step 5, the gateway node 704 proxies the response back to the client 702. At step 6, the resulting documentation is stored on-disk, in a data store coupled with the gateway node 704, submitted to a third-party service, or kept in-memory. In some embodiments, notifications and monitoring alerts can be submitted directly by gateway node 704, or leveraging a third-party service, to communicate changes in the generated auto-documentation or a status of the parsing process. In some embodiments, if parsing fails or the API transaction is not understood by the auto-documentation plugin, an error notification can also be sent.

Figure 8:
FIG. 8 illustrates a sequence diagram of another use-case showing components and associated steps involved in generating auto-documentation according to an embodiment of the disclosed technology.

FIG. 8 illustrates a sequence diagram of another use-case showing components and associated steps involved in generating auto-documentation, according to an embodiment of the disclosed technology. Specifically, FIG. 8 corresponds to the use-case when the auto-documentation is generated based on post-processing a request (e.g., sent by one or more clients) and post-processing a response (e.g., received from the API). The components involved in the interaction are a client 802, a gateway node 804, and an API 806. At step 1, a client 802 makes a request to gateway node 804. At step 2, the gateway node 804 executes all of its functionalities but does not parse the request at this point. At step 3, the gateway node 804 proxies/load-balances the request to API 806, which returns a response.

At step 4, the gateway node 804 parses the request and the response, and generates auto-documentation associated with the request and the response. At step 5, the gateway node 804 proxies the response back to the client 802. At step 6, the resulting documentation is stored on-disk, in a data store coupled with the gateway node 804, submitted to a third-party service, or kept in-memory. In some embodiments, notifications and monitoring alerts can be submitted directly by gateway node 804, or leveraging a third-party service, to communicate changes in the generated auto-documentation or a status of the parsing process. In some embodiments, pre-processing a request and post-processing a response is preferred over post-processing a request and post-processing a response. Such a scenario can arise when a user wishes to document a request, even if the resulting response returns an error or fails. Typically, pre-processing a request and post-processing a response is used to partially document an endpoint. In some embodiments, the reverse is preferred. Such a scenario doesn't allow for partial documentation and is used to document the entire transaction of the request and the end response.

Figure 9:
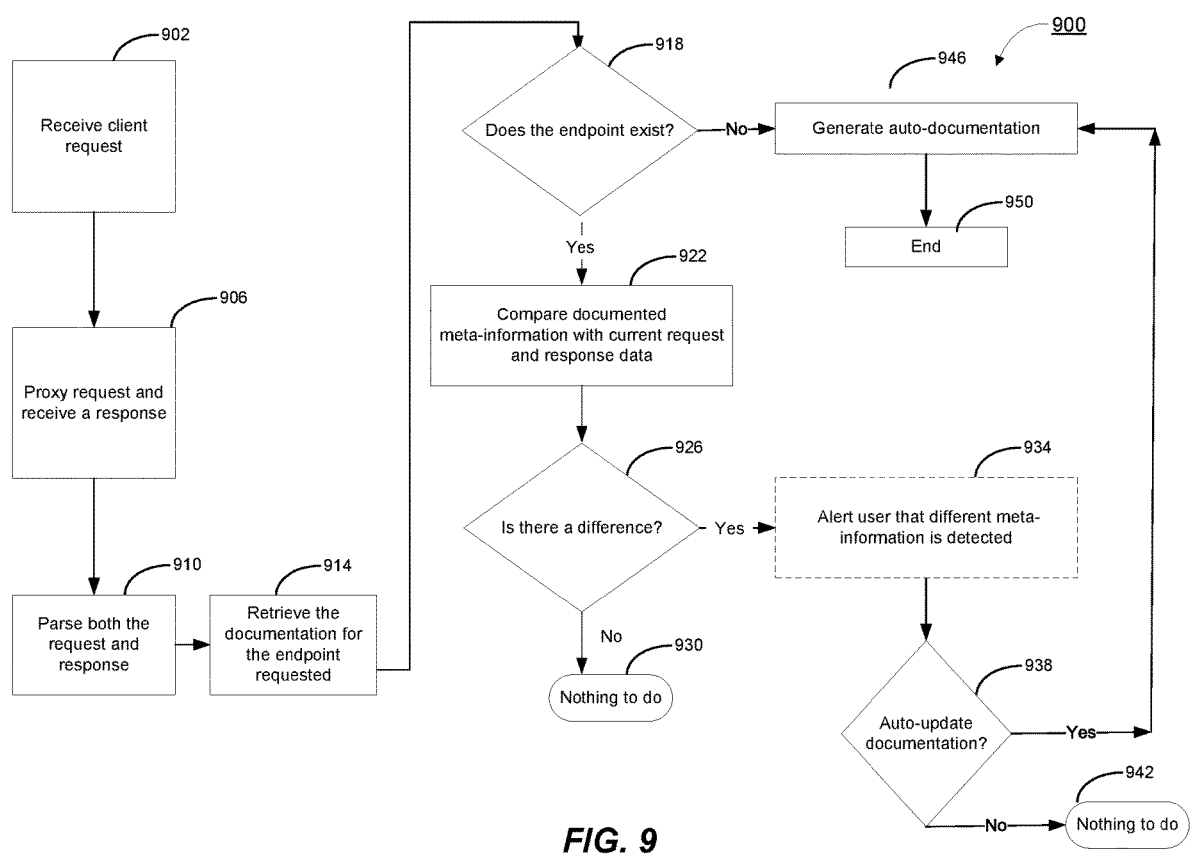
FIG. 9 illustrates a flow diagram showing steps involved in generating auto-documentation, according to an embodiment of the disclosed technology.

FIG. 9 illustrates a flow diagram 900 showing steps involved in generating auto-documentation at a gateway node, according to an embodiment of the disclosed technology. The flow diagram in FIG. 9 corresponds to the use-case when the auto-documentation is generated based on post-processing a request and post-processing a response. At step 902, a gateway node receives a client request. At step 906, the gateway node proxies the request and receives a response from the API. The response is sent back to the client. At step 910, the gateway node parses both the request and the response. At step 914, the gateway node retrieves (from local storage and remote storage of file system) the documentation for the endpoint requested. Retrieving the documentation for the endpoint is possible when the plugin has already auto-documented the same endpoint before.

Upon retrieving the prior documentation, the gateway node can compare the prior documentation with the current request to identify differences. At step 918, the gateway node determines whether the endpoint exists. If the gateway node determines that the endpoint exists, then the getaway node compares (at step 922) prior documented auto-documentation (in the retrieved documentation) with the current request and response data (e.g., headers, parameters, body, and other aspects of the request and response data). If the gateway node determines that there is no difference in the prior documented auto-documentation (in the retrieved documentation) and the current request and response data, then the gateway node enters (at step 930) a "nothing to do" state in which the gateway node doesn't take any further action, and continues monitoring requests/responses to/from the API. If the gateway node determines (at step 926) that there is a difference in the prior documented auto-documentation (in the retrieved documentation) and the current request and response data, then the gateway node alerts/notifies (optionally, at step 934) a user that different auto-documentation is detected. The gateway node can notify the user via an internal alert module, sending an email to the user, or using a third-party notification service such as Pagerduty.

At step 938, the gateway node determines whether the auto-documentation is to be updated. If the gateway node determines that the auto-documentation does not need to be updated, then the gateway node enters (at step 942) a "nothing to do" state in which the gateway node doesn't take any further action, and continues monitoring requests/responses to/from the API. If the gateway node determines that the auto-documentation needs to be updated, then the gateway node generates (step 946) auto-documentation for the current API transaction and stores the request and response meta-information (e.g., headers, parameters, body, etc.) in a data store or local cache. In some embodiments, if the gateway node determines at step 918 that the endpoint does not exist, then the getaway node generates auto-documentation at step 946 which includes information about the endpoint (which is newly-created). If the documentation for a specific endpoint is missing, the reason could be because the endpoint is unique and has not been requested before.

An example of a request (e.g., sent by one or more clients) is provided below:

```
POST /do/something HTTP/1.1
Host: server
Accept: application/json
Content-Length: 25
Content-Type: application/x-www-form-urlencoded
param1=value¶m2=value
```

An example of a response (e.g., received from the API) is provided below:

```
HTTP/1.1 200 OK
Connection: keep-alive
```

```
Date: Wed, 07 Jun 2017 18:14:12 GMT
Content-Type: application/json
Content-Length: 33
{"created":true, "param1":"value"}
```

In other embodiments, the auto-documentation functionality can be integrated with an application server or a web server, and not necessarily a gateway node. In such embodiments, the application server (or the web server) can host the API application and be an entry point for an endpoint provided by the API.

Figure 10:
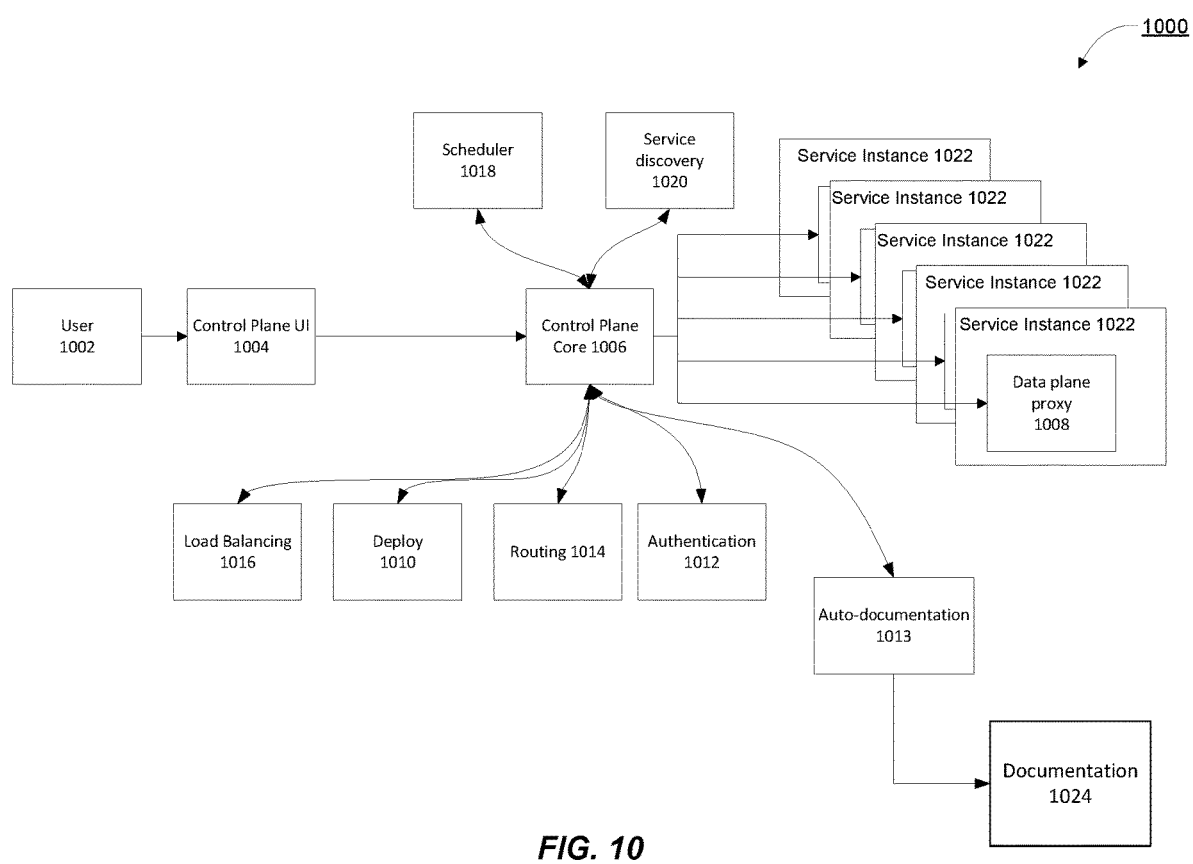
FIG. 10 is a block diagram of a control plane system for a service mesh in a microservices architecture.

FIG. 10 is a block diagram of a control plane system 1000 for a service mesh in a microservices architecture. A service mesh data plane is controlled by a control plane. In a microservices architecture, each microservice typically exposes a set of what are typically fine-grained endpoints, as opposed to a monolithic application where there is just one set of (typically replicated, load-balanced) endpoints. An endpoint can be considered to be a URL pattern used to communicate with an API.

Service mesh data plane: Touches every packet/request in the system. Responsible for service discovery, health checking, routing, load balancing, authentication/authorization, and observability.

Service mesh control plane: Provides policy and configuration for all of the running data planes in the mesh. Does not touch any packets/requests in the system but collects the packets in the system. The control plane turns all the data planes into a distributed system.

A service mesh such as Linkerd, NGINX, HAProxy, Envoy co-locate service instances with a data plane proxy network proxy. Network traffic (HTTP, REST, gRPC, Redis, etc.) from an individual service instance flows via its local data plane proxy to the appropriate destination. Thus, the service instance is not aware of the network at large and only knows about its local proxy. In effect, the distributed system network has been abstracted away from the service programmer. In a service mesh, the data plane proxy performs a number of tasks. Example tasks disclosed herein include service discovery, update discovery, health checking, routing, load balancing, authentication and authorization, and observability.

Service discovery identifies each of the upstream/backend microservice instances within used by the relevant application. Health checking refers to detection of whether upstream service instances returned by service discovery are ready to accept network traffic. The detection may include both active (e.g., out-of-band pings to an endpoint) and passive (e.g., using 3 consecutive 5xx as an indication of an unhealthy state) health checking. The service mesh is further configured to route requests from local service instances to desired upstream service clusters.

Load balancing: Once an upstream service cluster has been selected during routing, a service mesh is configured load balance. Load balancing includes determining which upstream service instance should the request be sent; with what timeout; with what circuit breaking settings; and if the request fails should it be retried?

The service mesh further authenticates and authorizes incoming requests cryptographically using mTLS or some other mechanism. Data plane proxies enable observability features including detailed statistics, logging, and distributed tracing data should be generated so that operators can understand distributed traffic flow and debug problems as they occur.

In effect, the data plane proxy is the data plane. Said another way, the data plane is responsible for conditionally translating, forwarding, and observing every network packet that flows to and from a service instance.

The network abstraction that the data plane proxy provides does not inherently include instructions or built in methods to control the associated service instances in any of the ways described above. The control features are the enabled by a control plane. The control plane takes a set of isolated stateless data plane proxies and turns them into a distributed system.

A service mesh and control plane system 1000 includes a user 1002 whom interfaces with a control plane UI 1004. The UI 1004 might be a web portal, a CLI, or some other interface. Through the UI 1004, the user 1002 has access to the control plane core 1006. The control plane core 1006 serves as a central point that other control plane services operate through in connection with the data plane proxies 1008. Ultimately, the goal of a control plane is to set policy that will eventually be enacted by the data plane. More advanced control planes will abstract more of the system from the operator and require less handholding.

control plane services may include global system configuration settings such as deploy control 1010 (blue/green and/or traffic shifting), authentication and authorization settings 1012, route table specification 1014 (e.g., when service A requests a command, what happens), load balancer settings 1016 (e.g., timeouts, retries, circuit breakers, etc.), a workload scheduler 1018, and a service discovery system 1020. The scheduler 1018 is responsible for bootstrapping a service along with its data plane proxy 1018.

Services 1022 are run on an infrastructure via some type of scheduling system (e.g., Kubernetes or Nomad). Typical control planes operate in control of control plane services 1010-1020 that in turn control the data plane proxies 1008. Thus, in typical examples, the control plane services 1010-1020 are intermediaries to the services 1022 and associated data plane proxies 1008. An auto-documentation unit 1023 is responsible for parsing copied packets originating from the data plane proxies 1008 and associated with each service instance 1022. Data plane proxies 1008 catch requests and responses that are delivered in between services 1022 in addition to those that responses and requests that originate from outside of the microservices architecture (e.g., from external clients).

The auto-documentation unit 1023 updates documentation 1024 relevant to the associated service instances 1022 as identified by the auto-documentation unit 1023. Documentation 1024 may be present in source code for the services 1022 or in a separate document.

As depicted in FIG. 10, the control plane core 1006 is the intermediary between the control plane services 1010-1020 and the data plane proxies 1008. Acting as the intermediary, the control plane core 1006 removes dependencies that exist in other control plane systems and enables the control plane core 1006 to be platform agnostic. The control plane services 1010-1020 act as managed stores. With managed storages in a cloud deployment, scaling and maintaining the control plane core 1006 involves fewer updates. The control plane core 1006 can be split to multiple modules during implementation.

The control plane core 1006 passively monitors each service instance 1022 via the data plane proxies 1008 via live traffic. However, the control plane core 1006 may take active checks to determine the status or health of the overall application.

The control plane core 1006 supports multiple control plane services 1010-1020 at the same time by defining which one is more important through priorities. Employing a control plane core 1006 as disclosed aids control plane service 1010-1020 migration. Where a user wishes to change the control plane service provider (ex: changing service discovery between Zookeeper based discovery to switch to Consul based discovery), a control plane core 1006 that receives the output of the control plane services 1010-1020 from various providers can configure each regardless of provider. Conversely, a control plane that merely directs control plane services 1010-1020 includes no such configuration store.

Another feature provided by the control plane core 1006 is Static service addition. For example, a user may run Consul, but you want to add another service/instance (ex: for debugging). The user may not want to add the additional service on the Consul cluster. Using a control plane core 1006, the user may plug the file-based source with custom definition multi-datacenter support. The user may expose the state hold in control plane core 1006 as HTTP endpoint, plug the control plane core 1006 from other datacenters as a source with lower priority. This will provide fallback for instances in the other datacenters when instances from local datacenter are unavailable.

Figure 11:
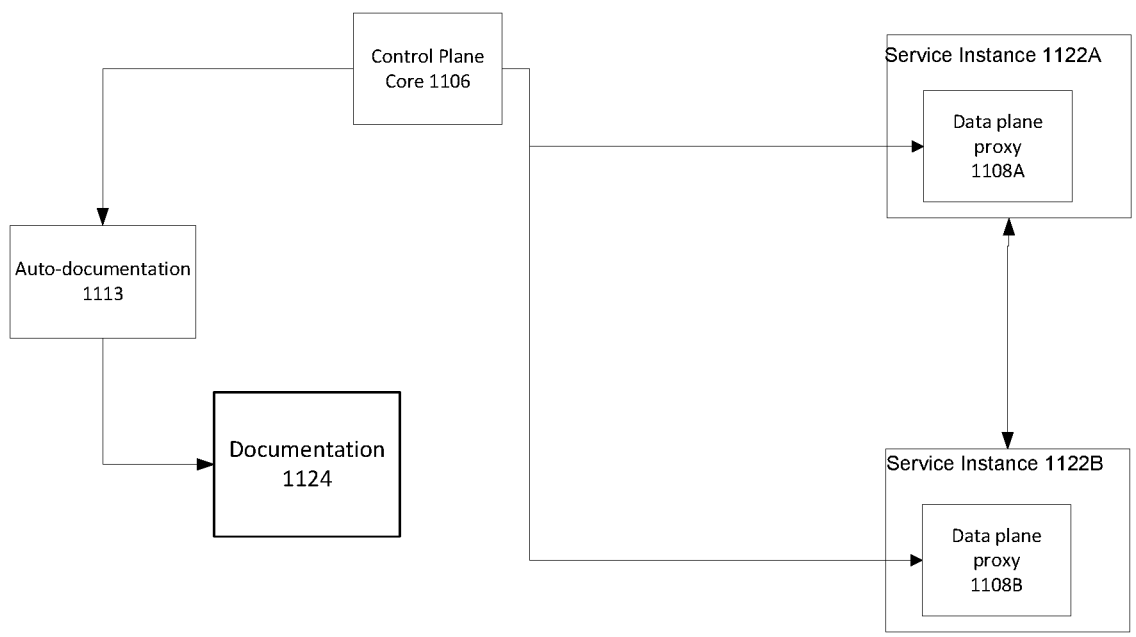
FIG. 11 is a block diagram illustrating communication between APIs resulting in updated documentation.

FIG. 11 is a block diagram illustrating communication between APIs resulting in updated documentation. In a microservices application architecture a plurality of APIs 1122A, B communicate with one another to produce desired results of a larger application. A control plane 1106 is communicatively coupled to the plurality of APIs 1122A, B via data plane proxies 1108A, B.

The control plane 1106 is configured to receive an incoming proxied request of a first API 1122A, via a respective data plane proxy 1108A, directed to a second API 1122B. The control plane 1106 receives the proxied response from the second API 1122B, via a respective second data plane proxy 1108B. In practice, there are many more APIs 1122 and respective proxies 1108 than the two pictured in the figure. Because of the microservices architecture, where each API is a "service," the client/server relationship may exist in between many of the APIs that are intercommunicating within the microservices application.

Once received by the control plane 1106, auto-documentation unit 1113 of the control plane 1106 parses the proxied requests/responses and extracts current data similarly as described by other auto-documentation embodiments. The auto-documentation plugin is configured to generate auto-documentation in response to a transaction that includes the request and the response. The auto-documentation may be newly generated or updates to existing documentation. A data store including stores the newly created or updated documentation 1124.

In some embodiments, a set of APIs 1122 may operate together as a service group. A service group may have an additional documentation repository that refers to the functions/operations of methods within the service group at a higher level than a granular description of each API. Because the control plane 1106 has visibility on all requests and responses in the microservices architecture, the Auto-documentation module 1113 may identify similar or matching objects across the requests/responses of multiple APIs. Similar objects are those that are semantically similar, those that reference matching object or class titles (though other portions of the object name may differ, e.g., "user" and "validatedUser" are similar as they both refer to the user). In some embodiments, similar objects may also call for the same data type (e.g., string, int, float, Boolean, custom object classes, etc.) while in the same service group.

Thus, documentation 1124 that results may include a description of an execution path and multiple stages of input before reaching some designated output.

Figure 12:
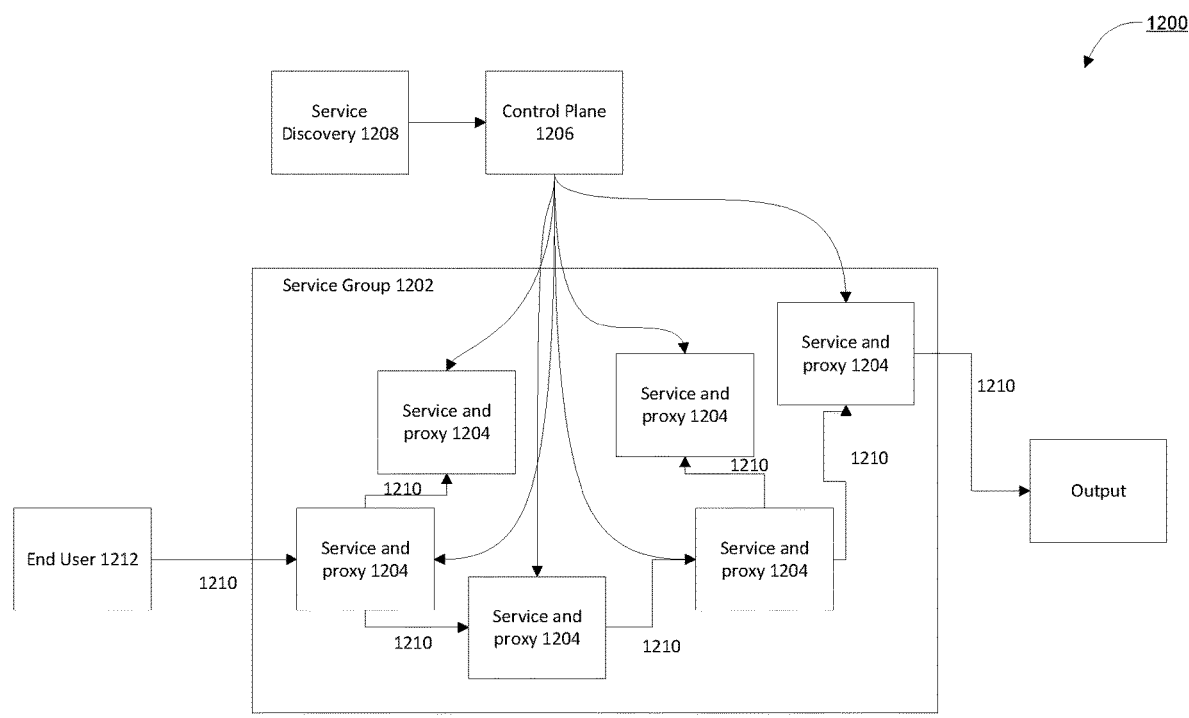
FIG. 12 is a block diagram illustrating service groups and features associated with identification thereof.
Figure 13:
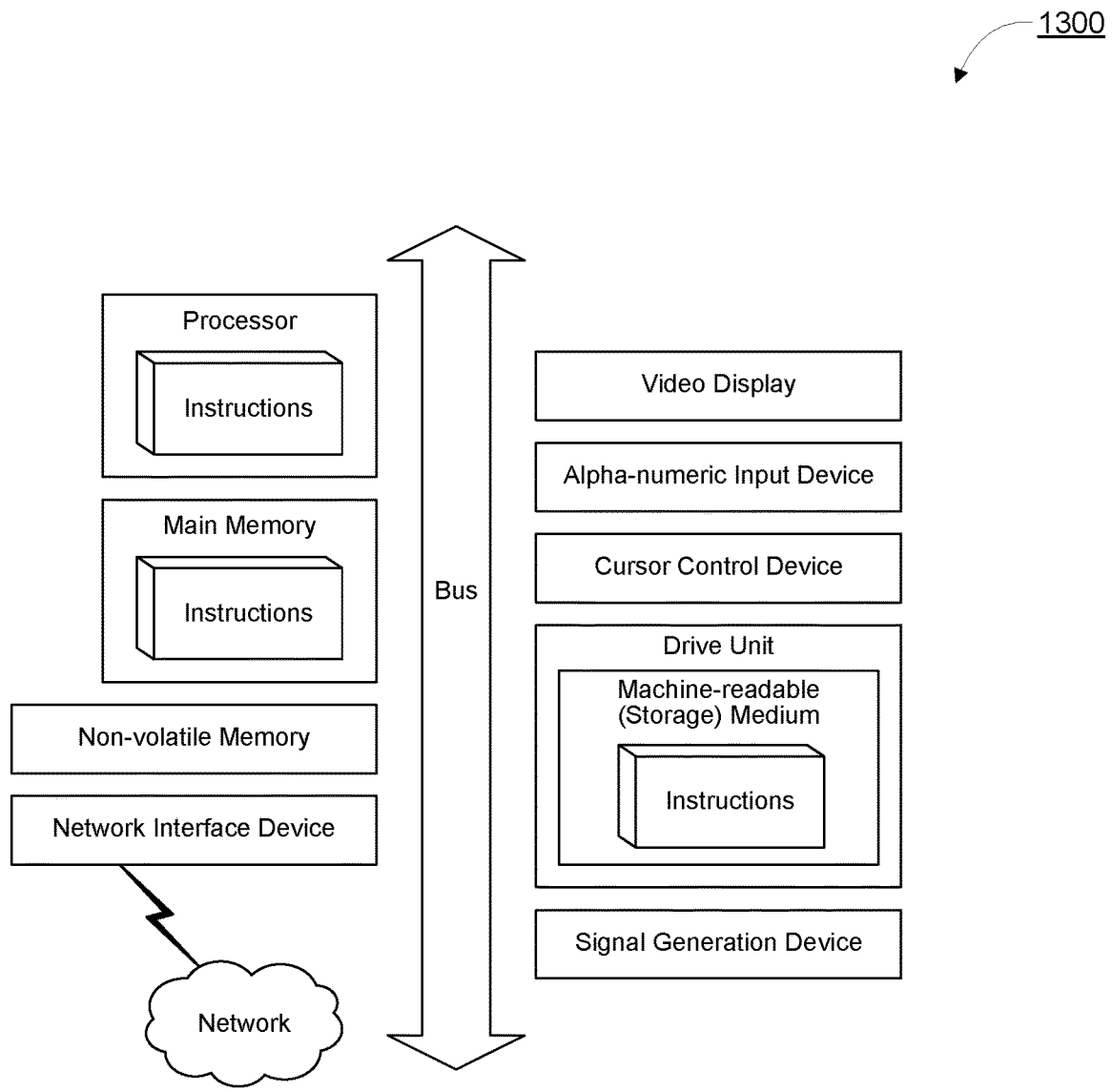
FIG. 13 depicts a diagrammatic representation of a machine in the example form of a computer system within a set of instructions, causing the machine to perform any one or more of the methodologies discussed herein, to be executed.

FIG. 12 is a block diagram illustrating service groups 1202 and features associated with identification thereof. A service group 1202 is a group of services 1204 that together perform an identifiable application purpose or business flow. For example, a set of microservices are responsible for an airline's ticketing portion of their website. Other examples may include "customer experience," "sign up," "login," "payment processing", etc. Using a control plane 1206 with an associated service discovery 1208 feature, packets are be monitored as they filter through the overall application (ex: whole website).

Given a starting point of a given service group 1202, the control plane 1206 may run a trace on packets having a known ID and follow where those packets (with the known ID) go in the microservice architecture as tracked by data plane proxies. In that way, the system can then automatically populate a service group 1202 using the trace. The trace is enabled via the shared execution path of the data plane proxies. Along each step 1210 between services 1204, the control plane 1204 measures latency and discover services. The trace may operate on live traffic corresponding to end users 1212, or alternatively using test traffic.

As output, the control plane generates a dependency graph of the given service group 1202 business flow and reports via a GUI. Using the dependency graph, a backend operator is provided insight into bottlenecks in the service group 1202. For example, in a given service group 1202, a set of services 1204 may run on multiple servers that are operated by different companies (e.g., AWS, Azure, Google Cloud, etc.). The latency between these servers may slow down the service group 1202 as a whole. Greater observability into the service group 1202 via a dependency graph enables backend operators to improve the capabilities and throughput of the service group 1202.

Exemplary Computer System

FIG. 12 shows a diagrammatic representation of a machine in the example form of a computer system 1200, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

All patents, applications and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

The invention claimed is:

1. A system for securing, managing, and extending functionalities of Application Programming Interfaces (APIs) in a microservices architecture, the system comprising:
   a plurality of APIs organized into a microservices application architecture that comprises a microservices application; and
   a processor operated control plane communicatively coupled to the plurality of APIs via data plane proxies, wherein the control plane is configured to:
      receive an incoming proxied request from a first API of the plurality of APIs directed to a second API of the plurality of APIs, the proxied request relayed to the control plane via a first data plane proxy associated with the first API;

receive a proxied response from the second API, the proxied response relayed to the control plane via a second data plane proxy associated with the second API;

parse the proxied request and the proxied response and extract current data;

in response to a transaction that includes the request and the response, execute an auto-documentation plugin, wherein the auto-documentation plugin is configured to generate documentation based on the current data; and a data store configured to store the control plane and the documentation.

2. The system of claim 1, further comprising:

a first gateway node and a second gateway node, the first gateway node and second gateway node configured as external end-points of the microservices application, wherein the first and second gateway nodes are further configured to:

save, by the first gateway node, software code in the data store, wherein the software code is associated with a given plugin included in a plurality of plugins;

retrieving, by the second gateway node, the software code from the data store; and installing, by the second gateway node, the given plugin at the second gateway node, using the retrieved software code associated with the given plugin.

3. The system of claim 1, further comprising:

a memory architecturally separate from the plurality of APIs, the memory including a program code library configured to execute functionalities common to execution of the plurality of APIs on a node in communication with the memory.

4. The system of claim 2, further comprising:

an administration API for configuring and installing the plurality of plugins, wherein the administration API is used for provisioning the plurality of APIs.

5. The system of claim 1, wherein the request is parsed subsequent to the receiving the response from the API.

6. The system of claim 1, wherein the request is parsed independently from delivery to the second API.

7. The system of claim 1, wherein the auto-documentation is in the form of a Swagger file, a RAML file, or an API Blueprint file.

8. The system of claim 1, wherein the auto-documentation includes one or more endpoints, one or more parameters, or one or more methods of the transaction.

9. The system of claim 1, wherein the request and the response is associated with an endpoint, wherein executing the auto-documentation plugin for the transaction includes:

retrieving previously generated documentation for the endpoint;

comparing the previously generated auto-documentation with the current data to determine the difference; and upon determining a difference, generating documentation for the transaction.

10. The system of claim 9, wherein the previously generated documentation associated with the endpoint and includes at least one of: a body, one or more headers, or one or more parameters.

11. The system of claim 9, wherein executing the auto-documentation plugin for the transaction includes:

upon determining a difference does not exist, entering a state associated with not generating documentation for the transaction.

12. The system of claim 9, wherein executing the auto-documentation plugin for the transaction includes:

upon determining the difference, electronically generating a notification for alerting the difference to a user.

13. A system comprising:

a processor operated application program interface (API) gateway architecturally positioned to receive proxied communications between a plurality of APIs that operate a microservices application, the proxied communications are transmitted via data plane proxies that correspond to each of the plurality of APIs, wherein the API gateway parses API requests and responses in between the plurality of APIs and extracts current data and executes an auto-documentation program function, wherein the auto-documentation program function is configured to generate auto-documentation in response to a transaction that includes the request and the response, the auto-documentation based on the transaction; and a memory architecturally separate from the microservices application, the memory including a program code library configured to execute functionalities common to execution of the plurality of APIs on the API gateway in communication with the memory.

14. The system of claim 13, wherein the API gateway further comprises:

a network interface that receives client requests, executes the program code library, and performs load balancing; and a data store that stores the program code library.

15. The system of claim 14, the API gateway further comprising:

a gateway cache that stores portions or all of the functionalities common to execution of the plurality of APIs and improves execution time over accessing the auto-documentation program function via the data store.

16. The system of claim 13, wherein the functionalities common to execution of the plurality of APIs comprise any of:

authentication;
logging;
caching;
transformations;
rate-limiting; or
any combination thereof.

17. The system of claim 13, wherein the functionalities common to execution of the plurality of APIs includes a first program function and a second program function.

18. The system of claim 17, the API gateway further comprising:

an administration API programmed to configure and install the first and second program functions, and further programmed to provision the API.

19. The system of claim 17, wherein the plurality of APIs cannot perform the first or second program functions without code from the program code library on a proxy server.

20. A method for securing, managing, and extending functionalities of a plurality of Application Programming Interfaces (APIs) in a microservices architecture, the method comprising:

receiving, by a control plane, an incoming proxied request from a first API of the plurality of APIs directed to a second API of the plurality of APIs, the proxied request relayed to the control plane via a first data plane proxy associated with the first API;

receiving, by the control plane, a proxied response from the second API, the proxied response relayed to the control plane via a second data plane proxy associated with the second API;

parsing the proxied request and the proxied response and extracting current data;

in response to a transaction that includes the request and the response, executing an auto-documentation plugin, wherein the auto-documentation plugin is configured to generate documentation based on the current data between the first API and the second API;

identifying, by the control plane, a set of APIs of the plurality of APIs that belong to a service group;

parsing requests and responses between the set of APIs belonging to the service group;

identifying similar or matching objects across the requests and responses of multiple APIs; and in response to said identification of the set of APIs, executing the auto-documentation plugin, wherein the auto-documentation plugin is configured to generate service group level documentation based on requests and responses within the service group.

21. The method of claim 20, wherein the set of APIs that belong to the service group are along a same execution path.

* * * * *